(12) United States Patent
Schaaf et al.

(10) Patent No.: US 7,832,273 B2
(45) Date of Patent: Nov. 16, 2010

(54) SENSOR DEVICE FOR VEHICLES

(75) Inventors: Gunther Schaaf, Kornwestheim (DE); Nils Janke, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 761 days.

(21) Appl. No.: 11/699,803

(22) Filed: Jan. 29, 2007

(65) Prior Publication Data

US 2007/0194892 A1   Aug. 23, 2007

(30) Foreign Application Priority Data

Feb. 3, 2006   (DE) ................. 10 2006 004 874

(51) Int. Cl.
*G01N 29/00* (2006.01)
(52) U.S. Cl. ............. 73/584; 73/632; 73/866.5
(58) Field of Classification Search .......... 73/584, 73/632, 866.5; 310/348, 330

See application file for complete search history.

(56) References Cited

U.S. PATENT DOCUMENTS

| | | | | |
|---|---|---|---|---|
| 4,711,527 A | * | 12/1987 | Rimmell et al. | 359/726 |
| 4,734,611 A | * | 3/1988 | Granz | 310/324 |
| 4,782,469 A | * | 11/1988 | Granz et al. | 367/157 |
| 4,893,856 A | | 1/1990 | Council | |
| 4,906,082 A | * | 3/1990 | Gold | 359/742 |
| 6,132,662 A | | 10/2000 | Preisler et al. | |
| 7,313,960 B2 | * | 1/2008 | Kawashima | 73/632 |
| 7,497,121 B2 | * | 3/2009 | Okuda et al. | 73/632 |
| 7,513,158 B2 | * | 4/2009 | Watanabe et al. | 73/584 |
| 7,545,082 B2 | * | 6/2009 | Nakajima | 310/334 |
| 7,554,248 B2 | * | 6/2009 | Oda et al. | 310/348 |
| 7,568,377 B2 | * | 8/2009 | Bhethanabotla et al. | 73/24.06 |

FOREIGN PATENT DOCUMENTS

| | | |
|---|---|---|
| DE | 44 10 895 | 10/1995 |
| DE | 296 14 691 | 11/1996 |
| EP | 1431957 | 6/2004 |
| WO | WO 0212027 | 2/2002 |
| WO | WO0212027 | * 2/2002 |
| WO | WO2007144064 | * 12/2007 |

* cited by examiner

*Primary Examiner*—J M Saint Surin
(74) *Attorney, Agent, or Firm*—Kenyon & Kenyon LLP

(57) ABSTRACT

A sensor device includes an ultrasonic sensor and a sensor cover in the form of a foil, the ultrasonic sensor having an oscillatory sensor element, which is affixed inside a housing, having an end face, of the ultrasonic sensor, the ultrasonic sensor being able to be accommodated in a recess or bore hole of an external vehicle component, and the sensor element and the housing being able to be covered by the sensor cover on the outside, the sensor cover being mountable directly on the ultrasonic sensor and forming an at least essentially planar surface whose outline is adapted to the outline of the end face of the housing and coincides in an essentially flush manner with the end face of the housing of the ultrasonic sensor, and the sensor cover reflecting light having a color spectrum in the range of chrome color and a reflection capacity in the range of polished chrome.

21 Claims, 2 Drawing Sheets

SENSOR DEVICE FOR VEHICLES

FIELD OF THE INVENTION

The present invention relates to a sensor device for vehicles, to an installation method suitable for such, as well as to a sensor cover for a sensor device of this type. The sensor device includes an ultrasonic sensor and a sensor cover in the form of a foil, and the ultrasonic sensor is able to be accommodated in a recess or bore hole of an external vehicle component; it has an oscillatory sensor element, which is supported inside a housing of the ultrasonic sensor, and a sensor cover may cover the sensor element and the housing on the outside.

BACKGROUND INFORMATION

Such sensor devices are used especially in motor vehicles within the framework of driver assistance systems known as park distance control (PDC), in order to assist the driver during maneuvering or parking of the motor vehicle. These PDC systems operate with the aid of ultrasonic distance-measuring devices, which are normally mounted only in the rear section or in the rear section as well as the front section of the vehicle. In particular, the distance with respect to the objects in close proximity is measured, especially the remaining space behind the vehicle, and an optic and/or acoustic signal unit emits a signal as a function of the measured distance for this purpose. The distance may be indicated by, for example, light diodes of different colors and/or by an interval sound, a shortening of the intervals indicating a decrease in the available clearance.

A sensor device of the type mentioned in the introduction is described in German Patent Application No. DE 44 10 895. In particular, it provides a method and a device for the concealed installation of a sensor in an external vehicle component, especially in a safety bumper. For this purpose, a cover is placed on top, which is adapted to the outer contour of the external vehicle component in a form fit and which completely covers the outer vehicle component or, at the very least, covers it at the location where the sensor is installed, so that the vehicle design is not marred by the concealed installation of the sensor. In particular, the material of the cover is discussed, which also may be formed by an appropriately strong foil. According to German Patent Application No. DE 44 10 895, for instance, sufficient hardness or rigidity must be ensured for the cover so that signals from the ultrasonic sensor are damped as little as possible and the sensor is protected from external mechanical effects in a reliable manner.

In addition, German Patent No. DE 296 14 691 describes an ultrasonic sensor whose housing terminates in the form of a sensor cup, which is open at the front end and has a radially inwardly projecting annular edge. Resting against the annular edge, on the inside of the radiation side, is a Teflon foil, which is pressed against the annular edge by an inner sleeve via an inner screw screwed into the housing. The Teflon foil covers only the oscillatory sensor element so as to permit its use also in an aggressive atmosphere. The housing of the sensor is not covered.

Especially in the case of vehicles of the luxury category, there is often a preference that specific external components of the vehicle be chrome-colored, for instance in that the utilized material has a high chrome content, or in that the part is completely made of chrome or coated by a chrome layer. Safety bumpers or fenders are among these chrome-colored external vehicle components. Since ultrasonic sensors for parking aids are mostly considered standard equipment among the luxury class these days, there is the wish to install them also in external vehicle components that are chrome-colored. Here, too, the ultrasonic sensor should be barely noticeable, primarily for aesthetic reasons. For concealed or the most inconspicuous installation in the chrome-colored external vehicle components, the sensors are therefore coated by a primer and then chromed, and thereby receive their chrome color (galvanic coating).

However, this procedure has the serious disadvantage of having a highly adverse effect on the mechanical properties of the outer oscillatory diaphragm of the ultrasonic sensor inasmuch as it results in a changed E module and changed damping.

There is the particular problem that the layer thickness of the primer coat and chrome layer may vary, which causes the signal characteristic of the ultrasonic sensor to vary to different and undesired extents as well. Even if the variation of the layer thickness is able to be kept relatively minimal, it nevertheless leads to relatively large and, above all, unpredictable deviations due to the very narrow frequency band in which the sensor element is operating.

Furthermore, the applied chrome layer changes the mechanical properties of the sensor structure by increasing its rigidity and thus also the natural oscillation frequency. Although the applied mass of the primer coat and the chrome layer leads to a reduction in the natural oscillation frequency, the application of the relatively hard chrome material overcompensates for this effect, so that the natural oscillation frequency of the housing in the form of the sensor cup or diaphragm cup is increased overall, which also increases the transmission frequency. This detunes the sensor. This raising of the transmission frequency must be compensated by additional processing of the diaphragm cup in another machining step, for instance by reducing the layer thickness of the sensor element, especially its diaphragm, by machining already prior to the coating.

It is an objective of the present invention to provide a sensor device which is not only visually adapted to chrome-colored external vehicle components, but also reduces the required processing in connection with such an adaptation. Above all, however, the modifications of the mechanical properties of the sensor device that go hand-in-hand with the optical adaptation to chrome-colored external vehicle components must be reduced or at least kept within predictable limits that are narrower than in the related art. At the same time, it is the objective of the present invention to provide an installation method that allows an especially uncomplicated installation of the sensor device according to the present invention in the external vehicle component.

SUMMARY OF THE INVENTION

In contrast to known specific embodiments, the sensor device of the present invention has the advantage of offering not only an excellent visual adaptation to chrome-colored or chrome-coated external vehicle components, but of causing only an extremely minimal detuning of the ultrasonic sensor at the same time. An optimal functioning of the ultrasonic sensor is able to be achieved in a cost-effective manner using an especially simple design and with particularly low expenditure in terms of manufacturing technology.

The idea on which the present invention is based is to allow the sensor cover to be mounted directly on the ultrasonic sensor, and to have the sensor cover form an at least essentially planar surface whose outline is adapted to the outline of the front face of the housing and coincides with the surface of the end face of the housing of the ultrasonic sensor in an essentially level manner, and for the sensor cover to reflect light having a color spectrum within the range of chrome color and with a reflection capability in the range of polished chrome.

The use of chrome foil to cover the ultrasonic sensor results in a very satisfactory optical adaptation to chrome-colored and chrome-plated external vehicle components. Surprisingly, the problem of sensor detuning, i.e., the raising of the resonant frequency of the ultrasonic sensor, does not arise when chrome foil is used. Overall, the chrome foil is thin enough not to change the mechanical properties of the ultrasonic sensor to any significant degree. It is true that the mechanical properties of the sensor are slightly modified, in particular the natural oscillation frequency of the housing or the diaphragm lowered and the transmission frequency of the sensor lowered as a result; also, the post-oscillation response is affected to a negligible degree, since the chrome foil tends to have a damping effect. However, the mentioned changes in the mechanical properties are low compared to the machining/covering by chrome plating; above all, they are predictable and therefore more easily remedied.

Although the foil according to the present invention is primarily intended for visual adaptation to the environment of the chrome-colored installation location, it may simultaneously provide protection against corrosion as well.

In this application, "chrome foil" refers to all foils that are visually adapted to a chrome-plated surface. This may be accomplished by using a partial layer of the foil made of chrome. Also known, however, are plastic foils that have a metallic sheen without containing metal, in particular chrome. These types of foil are also included in the term "chrome foil". A foil is "chrome-colored" if it has a color spectrum in the range of chrome color and a reflection capability within the range of polished chrome, i.e., if it exhibits the essential visual characteristics of a polished, chrome-plated metal surface.

In particular the adaptation of the foil outline to the form of the front face of the sensor, i.e., the side that is visible when viewing the external vehicle component, allows an optional application of the foil even prior to or following installation of the ultrasonic sensor in the vehicle or in the external vehicle component, since the foil does not project beyond the immediate installation location, that is to say, beyond the opening cross section of the recess or the bore hole of the vehicle component.

For instance, a preferred development of the present invention may be achieved in that an edge region is adjacent to the planar surface of the sensor cover, the edge region being able to be brought into contact with an upper jacket section of a sensor cup or housing of the ultrasonic sensor. In this case the foil sits on the sensor cup like a lid. This refinement, in particular, also provides improved corrosion protection since the edge of the foil makes contact only with the jacket surface of the sensor cup and not already with the region of its outer edge surrounding the end face.

A visually particularly inconspicuous specific embodiment may be achieved if the outline of the planar surface of the sensor cover is identical and coincides with the outline of the end face of the housing or sensor cup.

According to an especially preferred specific embodiment of the sensor device, the sensor cover is integrally affixed on the ultrasonic sensor. The sensor cover is preferably bonded to the ultrasonic sensor.

An especially small change in the mechanical properties of the ultrasonic sensor may be achieved by designing the sensor cover without metal and making it exclusively from plastic.

Furthermore, minimal changes in the mechanical properties of the ultrasonic sensor may be achieved if the sensor cover has a thickness of between 10 µm and 600 µm, preferably between 50 µm and 200 µm. Nevertheless, thicker foils may be used as well.

Moreover, it is especially advantageous if a clearance is formed between the sensor cover and the oscillatory sensor element of the ultrasonic sensor. In the case of an annular housing having an opening in the front wall of the sensor cup, this clearance may remain free, or in the case of a housing in the form of a closed sensor cup, it may be taken up by the thickness of its front wall, which may preferably be in the range of 0.3 mm to 1 mm.

According to an additional, especially preferred specific embodiment of the sensor device, the ultrasonic sensor may be accommodated in a recess or bore hole of an external vehicle component, in such a way that the end face of its housing is at least essentially flush with the opening cross section of the recess or the bore hole. This achieves a visually especially inconspicuous placement.

The cover in the form of the foil may preferably be installed in such a way that, in a first step, the sensor cover is affixed on the ultrasonic sensor by bonding, in particular, and the ultrasonic sensor is mounted in the recess or bore hole of the external vehicle component in a second step. As an alternative, it is possible to install the ultrasonic sensor in the recess or bore hole of the external vehicle component in a first step, and to bond the sensor cover to the ultrasonic sensor in a second step.

DETAILED DESCRIPTION

Figure 1:
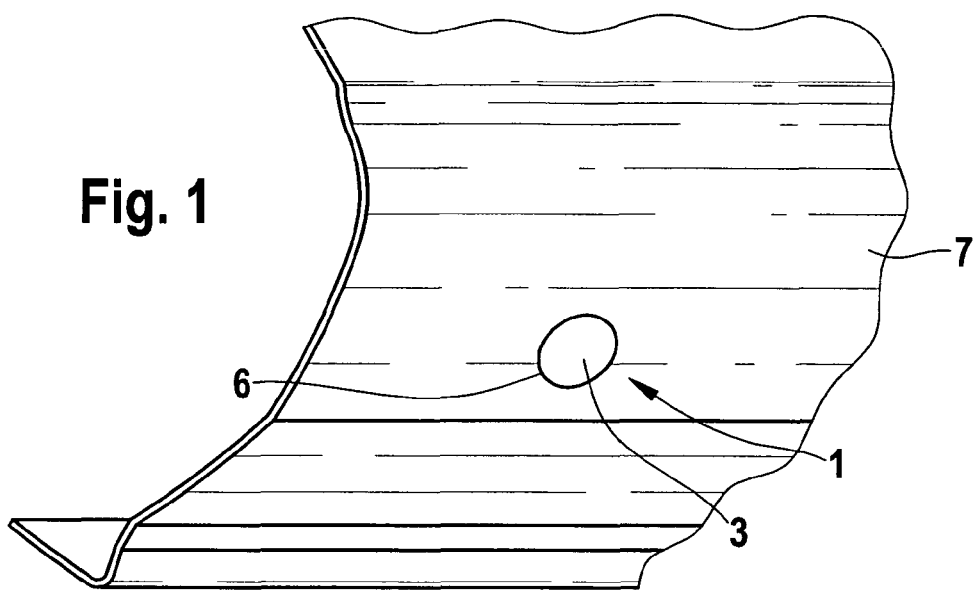
FIG. 1 shows a perspective part-view of a shock absorber having a sensor device according to the present invention.

Sensor device 1 shown in the figures is essentially made up of an ultrasonic sensor 2 and a sensor cover 3 which is bonded thereto and formed by a chrome foil. Ultrasonic sensor 2 itself includes an oscillatory sensor element 4 in the form of a sensor diaphragm, for instance, which is supported inside a cup-shaped housing 5 of ultrasonic sensor 2.

Ultrasonic sensor 2 is accommodated in a bore hole 6 of an external vehicle component 7 in the form of a shock absorber, in such a way that front end wall 8 of housing 5 having a thickness of approximately 0.6 mm is situated completely inside bore hole 5. The outside surface of end face 9 of housing 5 is flush with the opening cross section of bore hole 6.

The chrome foil as sensor cover 3 is bonded directly to end face 9. Its form and size are adapted to end face 9. In particular, chrome foil 3 thus does not project beyond the opening cross section formed by bore hole 6 and completely covers ultrasonic sensor 2 on the outside.

Chrome foil 3 is made up of a plurality of layers in this case. It includes a bonding layer via which it is bonded to ultrasonic sensor 2; situated on top are a bearing layer, a paint layer and, finally, a sturdy cover layer sealing chrome foil 3.

Figure 2:
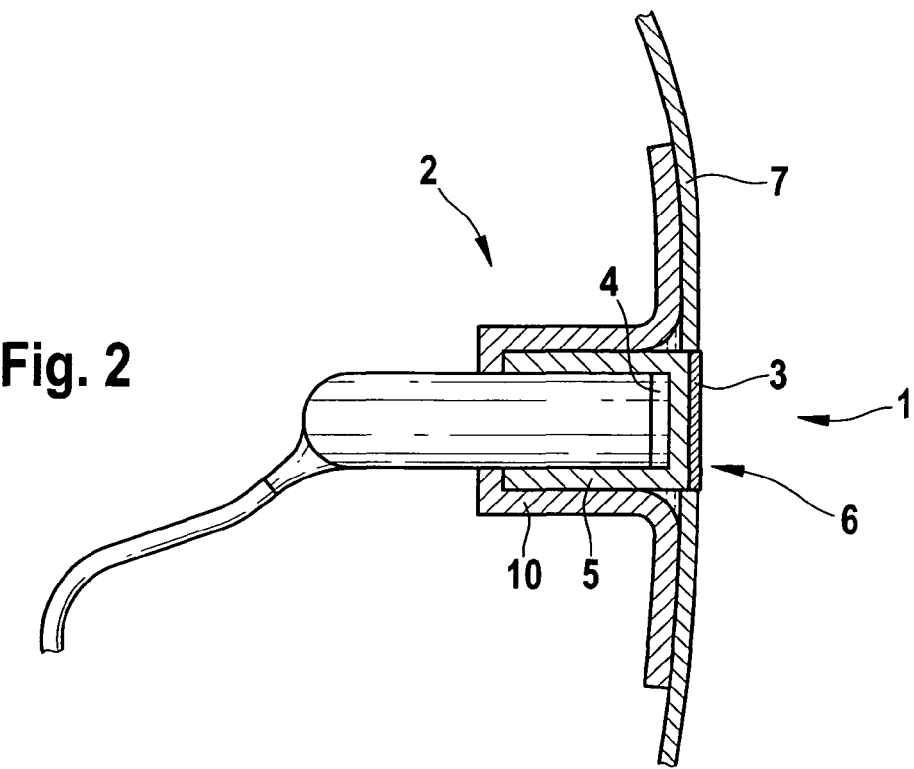
FIG. 2 shows a section through a sensor device installed in a shock absorber.

FIG. 2 clarifies the affixation of sensor device 1 on shock absorber 7 of a motor vehicle. Here, a bracket 10 having a bore is provided for this purpose, in which sensor device 1 is mounted with form locking via snap fasteners (not shown). The bracket may, for instance, be welded to the shock absorber.

Figure 3:
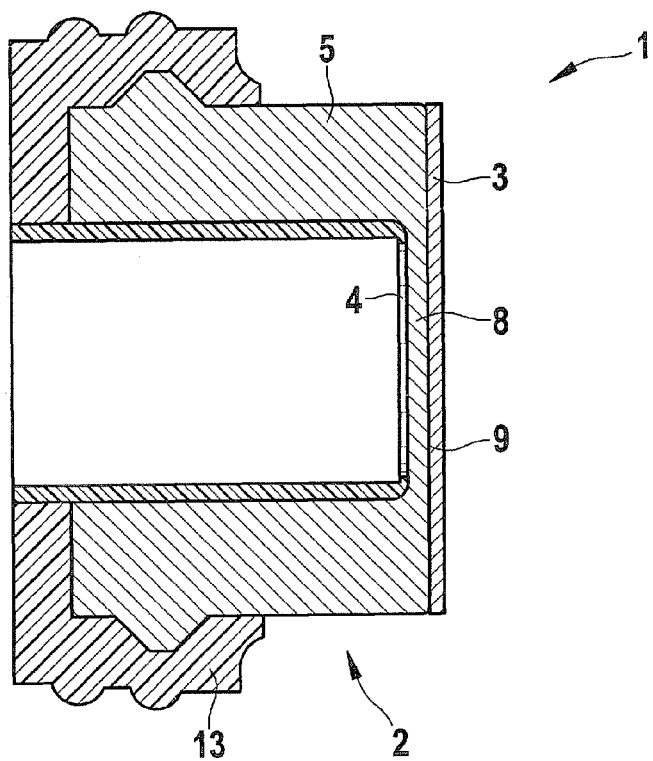
FIG. 3 shows a section through a third sensor device according to the present invention.
Figure 4:
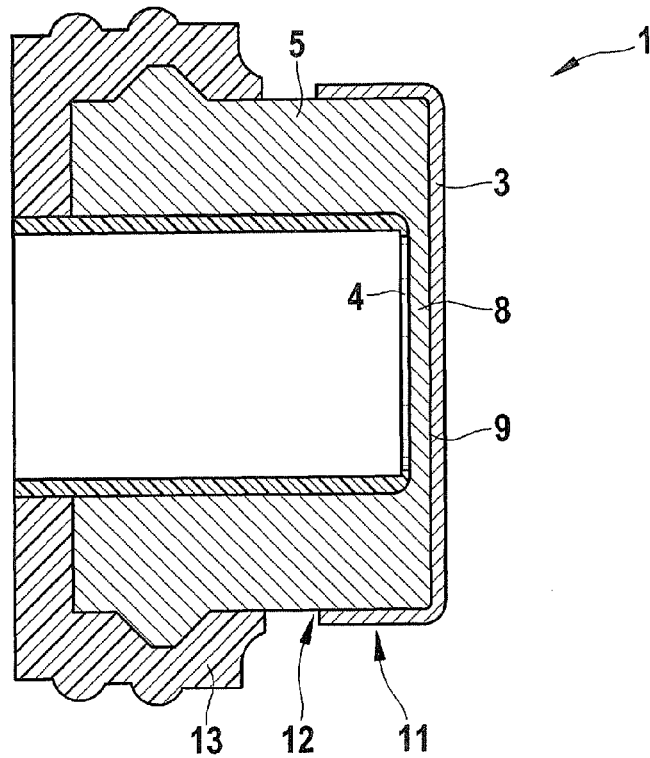
FIG. 4 shows a section through a fourth sensor device according to the present invention.

While FIG. 3 shows a sensor device 1 in which chrome foil 3 corresponds precisely to the form and dimensions of end face 9 of housing 5 formed by an aluminum cup, FIG. 4 illustrates a further development in which chrome foil 3 encloses sensor cup 5 in the form of a lid. The planar surface of sensor cover 3 formed by the chrome foil lies next to an edge region 11 that is bonded to an upper jacket section 12 of the sensor cup of ultrasonic sensor 2.

In FIG. 3 and in FIG. 4 as well, oscillatory sensor element 4 is formed by a piezoelectric ceramic, which is applied to end face 9 of sensor cup 5 on the inside.

Also illustrated here is a sealing and oscillation-decoupled element 13, which encloses sensor cup 5 radially on the outside across its outer circumference.

What is claimed is:

1. A sensor device, comprising:
   an ultrasonic sensor; and
   a sensor cover in the form of a foil;
   wherein the ultrasonic sensor includes a housing having an end face and an oscillatory sensor element mounted inside the housing, the ultrasonic sensor being able to be accommodated in one of a recess and a bore hole of an external vehicle component, the sensor element and the housing being able to be covered toward an outside by the sensor cover,
   wherein the sensor cover is affixable directly on the ultrasonic sensor, the sensor cover forming an at least substantially planar surface whose outline is adapted to an outline of the end face of the housing, and which substantially coincides in a flush manner with the end face of the housing of the ultrasonic sensor,
   wherein the sensor cover reflects light having a color spectrum in a range of a chrome color and a reflection capacity in a range of a polished chrome.

2. The sensor device according to claim 1, wherein the planar surface of the sensor cover lies next to an edge region, which is able to be brought into contact with an upper jacket section of the housing, including a sensor cup.

3. The sensor device according to claim 1, wherein the outline of the planar surface of the sensor cover is identical with the outline of the end face of the housing.

4. The sensor device according to claim 1, wherein the sensor cover is integrally mounted on the ultrasonic sensor.

5. The sensor device according to claim 1, wherein the sensor cover is bonded to the ultrasonic sensor.

6. The sensor device according to claim 1, wherein the sensor cover is made exclusively of polymer material.

7. The sensor device according to claim 1, wherein the sensor cover has a thickness in a range of 10 µm to 600 µm.

8. The sensor device according to claim 7, wherein the range is 50 µm to 200 µm.

9. The sensor device according to claim 1, wherein a clearance is formed between the sensor cover and the oscillatory sensor element of the ultrasonic sensor.

10. The sensor device according to claim 1, wherein the ultrasonic sensor is able to be accommodated in one of a recess and a bore hole of an external vehicle component, in such a way that the end face of the housing coincides in an at least substantially flush manner with an opening cross section of one of the recess and the bore hole.

11. A method for installing a sensor device on an external vehicle component, comprising:
   in a first step, affixing a sensor cover on an ultrasonic sensor by bonding; and
   in a second step, installing the ultrasonic sensor in one of a recess and a bore hole of the external vehicle component, wherein the ultrasonic sensor includes a housing having an end face and an oscillatory sensor element mounted inside the housing, wherein the ultrasonic sensor is accommodated in one of a recess and a bore hole of an external vehicle component, and wherein the sensor element and the housing are coverable by the sensor cover.

12. The sensor device according to claim 1, wherein the clearance between the sensor cover the oscillatory sensor element of the ultrasonic sensor is 0.33 mm to 1 mm.

13. The sensor device according to claim 1, wherein the sensor device is mounted with form locking via snap fasteners.

14. The sensor device according to claim 1, wherein the planar surface of the sensor cover lies next to an edge region, which is able to be brought into contact with an upper jacket section of the housing, including a sensor cup, wherein the outline of the planar surface of the sensor cover is identical with the outline of the end face of the housing, and wherein the sensor cover has a thickness in a range of 10 µm to 600 µm.

15. The sensor device according to claim 1, wherein the clearance between the sensor cover and the oscillatory sensor element of the ultrasonic sensor is 0.33 mm to 1 mm, wherein the sensor device is mounted with form locking via snap fasteners, wherein the planar surface of the sensor cover lies next to an edge region, which is able to be brought into contact with an upper jacket section of the housing, including a sensor cup, wherein the outline of the planar surface of the sensor cover is identical with the outline of the end face of the housing, and wherein the sensor cover has a thickness in a range of 10 µm to 600 µm.

16. The sensor device according to claim 15, wherein the sensor cover is integrally mounted on the ultrasonic sensor, wherein the sensor cover is made exclusively of polymer material, and wherein the range is 50 µm to 200 µm.

17. The sensor device according to claim 15, wherein the sensor cover is bonded to the ultrasonic sensor wherein the sensor cover is made exclusively of polymer material, and wherein the range is 50 µm to 200 µm.

18. The sensor device according to claim 15, wherein the ultrasonic sensor is able to be accommodated in one of a recess and a bore hole of an external vehicle component, in such a way that the end face of the housing coincides in an at least substantially flush manner with an opening cross section of one of the recess and the bore hole.

19. The sensor device according to claim 18, wherein the sensor cover is integrally mounted on the ultrasonic sensor, wherein the sensor cover is made exclusively of polymer material, and wherein the range is 50 µm to 200 µm.

20. The sensor device according to claim 18, wherein the sensor cover is bonded to the ultrasonic sensor wherein the sensor cover is made exclusively of polymer material, and wherein the range is 50 µm to 200 µm.

21. The sensor device according to claim 1, wherein a clearance is formed between the sensor cover and the oscillatory sensor element of the ultrasonic sensor.

* * * * *